(12) United States Patent
Keefe et al.

(10) Patent No.: US 6,749,376 B2
(45) Date of Patent: Jun. 15, 2004

(54) BINARY MACHINE TOOL HOLDER

(75) Inventors: William R Keefe, Orono, MN (US); Randolf N. Johnson, Bemidji, MN (US); Christopher M. Lodermeier, Goodhue, MN (US); Peter J. Ness, Minneapolis, MN (US); Bradley E. Rowell, Minneapolis, MN (US); Mark A. Shannon, Crystal, MN (US); John Niethammer, Stillwater, MN (US)

(73) Assignee: Command Tooling Systems, LLC, Ramsey, MN (US)

( * ) Notice: Subject to any disclaimer, the term of this patent is extended or adjusted under 35 U.S.C. 154(b) by 112 days.

(21) Appl. No.: 09/734,247

(22) Filed: Dec. 11, 2000

(65) Prior Publication Data

US 2002/0071728 A1 Jun. 13, 2002

(51) Int. Cl.[7] .......................... B23B 27/00; B23B 29/00
(52) U.S. Cl. .......................... 407/66; 407/119
(58) Field of Search .............................. 407/66, 30, 33, 407/34, 46, 47, 51, 99, 101, 102, 108, 110, 118, 119, 120, 158, 160, 161

(56) References Cited

U.S. PATENT DOCUMENTS

| | | | |
|---|---|---|---|
| 4,671,147 A | * | 6/1987 | Komanduri et al. ........ 310/338 |
| 4,746,252 A | * | 5/1988 | Jesinger ..................... 279/141 |
| 5,197,720 A | | 3/1993 | Renz |
| 5,277,435 A | | 1/1994 | Kramer . |
| 5,536,126 A | | 7/1996 | Gross ......................... 411/411 |
| 5,779,281 A | | 7/1998 | Kapgan et al. ......... 285/148.19 |
| 5,843,244 A | * | 12/1998 | Pelton et al. ................ 148/563 |
| 5,913,955 A | * | 6/1999 | Redmond et al. ........... 408/143 |
| 5,957,016 A | | 9/1999 | Segalman |
| 6,076,254 A | | 6/2000 | Onodera |
| 6,179,699 B1 | * | 1/2001 | Costa ......................... 451/288 |
| 6,202,521 B1 | * | 3/2001 | Rossetti et al. .............. 82/1.11 |
| 6,447,871 B1 | * | 9/2002 | Hawkins ....................... 428/67 |

FOREIGN PATENT DOCUMENTS

JP 01199707 11/1989 .......... B23B/31/10

OTHER PUBLICATIONS

Riven, E. I.; "Tooling Structure: Interface between Cutting Edge and Machine Tool"; *Annals of CIRP* vol. 49 (Feb. 2000) USA; pp. 591–634.

(List continued on next page.)

*Primary Examiner*—A. L. Wellington
*Assistant Examiner*—Brian D. Walsh
(74) *Attorney, Agent, or Firm*—Gray, Plant, Mooty, Mooty & Bennett, P.A.

(57) ABSTRACT

A tool holder having two distinct phases, a first phase in which the tool is held in an interference fit with sufficient mechanical interaction between the two for the tool to be rotated at high speed and perform its intended purpose on a workpiece, and a second phase in which the tool is sufficiently released from the interference fit to be rapidly removed from the holder (as by an automated apparatus).

51 Claims, 4 Drawing Sheets

OTHER PUBLICATIONS

Riven, E. I. and Kang, Hongling; "Enhancement of Dynamic Stability of Cantilever Tooling Structures"; *Int. of J. of Machine Tools & Manufacture*, vol 32 No. 4 (1992) USA; pp. 539–561.

Riven, E. I.; *Stiffness and Damping in Mechanical Design*; Marcel Dekker, Inc. (1999) USA; pp. 359–368.

Riven, E.I. and Xu, Like; "Damping of NiTi Shape Memory Alloys and its Application for Cutting Tools"; in *Materials for Noise and Vibration Control, ASME NCA—vol. 18/DE*; vol. 80 (1994) USA; pp. 35–41.

Derwent WPI abstract for EP 834380 A (U.S. 6,109,602), filed Apr. 8, 1998, Clamp for Frictional Clamping of Workpiece.

Derwent WPI abstract for DE 4232790, filed Feb. 10, 1994, Standard Stem for Rotary Cutting Tool.

Derwent WPI abstract for SU 1093436, filed May 23, 1984, Machine Spindle with Facility for Automatic Tool Change.

Derwent WPI abstract for RU 2084333, filed Jul. 20, 1997, Device for Sawdust–less cutting of timber.

Derwent WPI abstract for JP 8294835, filed Nov. 12, 1996, Clamping appts of index table in machine tool.

Alan Richter, Squeeze Play, Cutting Tool Engineering, Sep. 2000, p. 34–38.

T. Toby Hansen, Magnetostrictive Materials and Ultrasonics, CHEMTECH, Aug. 1996, p. 56–59.

Product Specification for Etrema Terfenol–D.

Web page showing project related to Binary Tool Holder at Univ. Minnesota sponsored by Command Tooling Systems.

5 web pages from SMA, Inc. regarding: 1) Setting Shapes in NiTi; 2) Selected Properties of NiTi; 3) Two–Way Memory; 4) Joining NiTi Materials; 5) Measuring Transformation Temperatures in NiTi Alloys.

* cited by examiner

BINARY MACHINE TOOL HOLDER

TECHNICAL FIELD

This invention concerns holders for machine tools.

BACKGROUND

Many cutting or forming tools must be held by a holder with sufficient mechanical interaction (e.g., static and dynamic stiffness, gripping strength, and the like) to enable the tool to perform its intended function on a workpiece as the holder and tool are moved (typically rotated), sometimes at high speed. In modern equipment, tools must be released from the tool holder and replaced with new tools by automated systems. For maximum productivity and cost effectiveness, this process should occur as quickly as possible.

One existing type of tool holder employs a shrink fit, in which the tool holder is heated so that it expands enough to accommodate the tool, and then actively or passively cooled so that it will contract and thus hold the tool during use. This approach involves relatively expensive actuation (heating) equipment, poses safety concerns due to the high temperatures involved for most industrial quality tools having relatively large amounts of metal, and is slower than desired.

DISCLOSURE OF INVENTION

In general terms, the invention is a holder for a cutting or forming tool that has two distinct phases. In the first phase, the tool is held with sufficient mechanical interaction between the holder and the tool for the tool to perform its intended purpose on a workpiece. In the second phase, the holder releases the tool sufficiently for it to be rapidly removed, such as by an automated apparatus. The holder may be repeatedly switched between the two phases by application of an external agent, such as by an actuation system of some type (e.g., a heating or cooling system, or a system for applying an electromagnetic field), without degradation of performance (e.g., loss of elasticity). As compared to conventional shrink fit tool holders, the invention provides reduced cost, safer actuation, and reduced time to exchange tools, all of which improve the cost effectiveness of the system.

BRIEF DESCRIPTION OF THE FIGURES

The figures illustrate examples and principles of the invention and therefore do not indicate limitations on the scope of the invention.

DETAILED DESCRIPTION

For convenience of example only, the invention will be described primarily with respect to shape memory alloys. Specific examples of materials suitable for use in the invention include, but are not limited to, shape memory alloys (such as NiTiNOL), magnetostrictive materials (such as TERFENOL-D), piezoelectric materials, and other materials having characteristics suitable within the context of the invention as described below.

Figure 1:
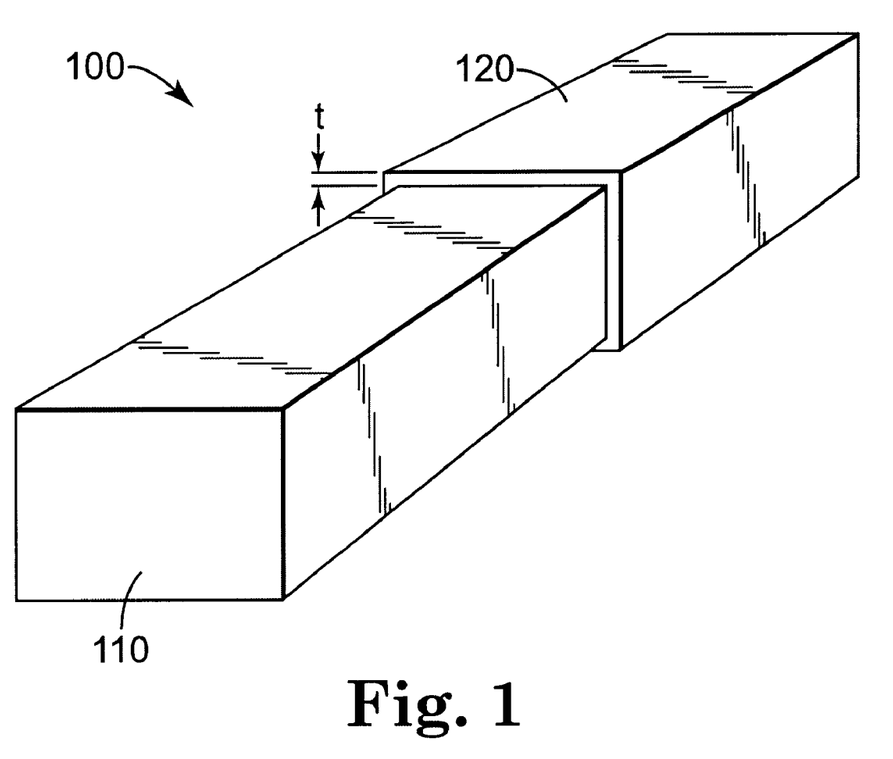
FIG. 1 is a schematic diagram illustrating an embodiment of the invention.

FIG. 1 is a schematic diagram illustrating one embodiment of the invention. The combination 100 of a cutting or forming tool 110 and tool holder 120 may be incorporated into any of a variety of machining systems (not shown) according to conventional principles. Tool holder 120 is configured (sized, shaped, etc.) to hold tool 110 by an interference fit. The interference fit provides sufficient mechanical interaction in the combination (e.g., static and dynamic stiffness, gripping strength, etc.) to enable tool 110 to perform its intended function. For example, holder 120 and tool 110 may be moved (typically rotated), sometimes at high speed, against a conventional workpiece (not shown).

Ensuring sufficient mechanical interaction generally involves engineering the shape, size, and composition of holder 120, taking the composition and materials properties of holder 120 into account. For example, parameters known to be relevant but capable of optimization while remaining within the scope of the invention include the tool dimensions (notably the thickness t), shank diameter and length, Young's modulus, Poisson ratio, coefficient of friction, minimum torque, tensile strength, desired pullout force, torque, tangential stress, and radial stress.

In a preferred embodiment of the invention, tool holder 120 comprises at least a layer of shape memory alloy (SMA) configured to hold machine tool 110 when the SMA is in its austenitic phase. The alloy composition is selected to place the martensitic/austenitic transition temperature below a temperature at which the cutting or forming occurs.

In another embodiment of the invention, tool holder 120 comprises at least a layer of SMA configured to hold machine tool 110 in the martensitic phase of the SMA, and the alloy composition is selected to place the martensitic/austenitic transition temperature above a temperature at which the cutting or forming occurs.

The strain characteristics of SMA materials make their use in the invention particularly valuable for tools having relatively small diameters, i.e., approximately 0.25 inch or less, but in general this is not a requirement of the invention.

As illustrated schematically in FIG. 1, tool holder 120 represents at least a layer of SMA that lies within a conventional tool holder, but an entire tool holder comprised of SMA is within the scope of the invention. Also within the scope of the invention is a laminate or other compound construction in which there is a plurality of layers of SMA materials that collectively perform as described above. For example, an embodiment within the scope of the invention would comprise two layers of SMA: a first or lower layer closest to the tool, which is martensitic at the working temperature of the tool; and a second or upper layer, which is austenitic at that temperature. The upper layer would be configured and trained to provide sufficient force onto the lower layer to hold the tool during use. Heating the lower layer into the austenitic phase would provide sufficient force to overcome the effect of the upper layer, and thus release the tool. Another example of an embodiment employing a laminate is one in which the superelasticity of the inner layer is exploited instead of specifically for expanding the outer layer.

In this invention, the term "layer" includes regions of SMA material smaller than the entire extent of the region in which the tool contacts the tool holder. For example, an embodiment in which force is adequately transmitted could include a tool holder having from two to five (depending on the number of degrees of freedom being controlled by the design) discrete points of contact with the tool. An example would be two to five regions of SMA arranged annularly around the inner diameter of a circular tool holder.

In all embodiments of the invention, it should be understood that an interference fit between a tool holder and a tool does not require intimate contact between the two provided that there is sufficient transfer of mechanical energy to the tool as otherwise described by the context of the situation.

Similarly, the rectangular cross-sections illustrated for tool 110 and tool holder 120 are schematic only. Suitable cross-sections include round, hexagonal, semicircular, square, etc. It is not necessary for the cross section to be uniformly sized throughout the length of the tool, e.g., a wedge-shaped cross section is within the scope of the invention. This embodiment permits designs in which the components of the forces acting on the tool have both longitudinal and radial components, but the principles of operation of the invention are within the skill of the art.

It is not necessary for the outer cross-section of tool holder 120 to be congruent with the inner cross-section, or with the outer cross-section of tool 110. It is only preferred and not required that the inner cross-section of tool holder 120 match the outer cross-section of tool 110. This preferred embodiment of the invention has several advantages over prior shrink-kit tool holders, including those that em poly SMA in different ways than the invention. For example, (U.S. Pat. No. 5,197,720 (Renz et al.) discloses a clamping tool using a flexible, highly deformable, SMA sleeve that relics on the superclasticity property of the SMA at the working temperature of the clamped workpiece. There is no "training" of the SMA material in reliance on the austenitic/martensitic phase transition, which is present in the SMA embodiments of this invention.

Another example is U.S. Pat. No. 5,277,435 (Krämer et al.), which discloses a separate hollow cylindrical "shrink collar" comprised of SMA, which is pushed onto a clamping sleeve which in turn holds the the tool. The SMA piece does not provide mechanical interaction with the tool itself, because it does not directly grip the tool. The clamping sleeve that does grip the tool is made of conventional material, not SMA. These factors constrain the design of the clamping sleeve, specifically its cross sectional thickness. Thus, any bending or side forces must be reacted though a cross section having relatively low moment of inertia, which lowers the static and dynamic stiffness of the interface with the tool. Thus, this design is not suited for machining, and high speed machining (e.g., milling) in particular. Another problem with this prior design is that the clamping sleeve has a natural state that is larger than the restricted diameter of the SMA collar. This allows the shrink collar to be installed in an untrained state, and trained by repeated use. By contrast, this embodiment of the invention exploits nearly the maximum strain available from the SMA without relying on the stress-induced martensitic phase.

EXAMPLE

Figure 2A:
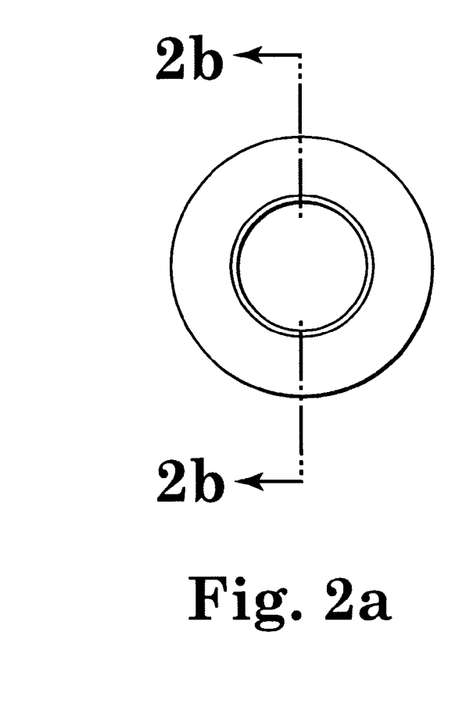
FIGS. 2 and 3 are schematic diagrams illustrating a prototype embodiment of the invention.
Figure 2B:
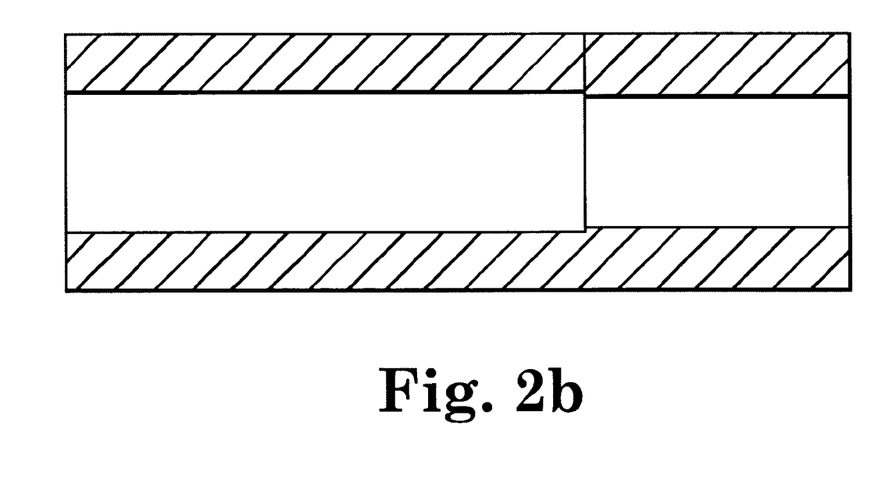
Figure 3A:
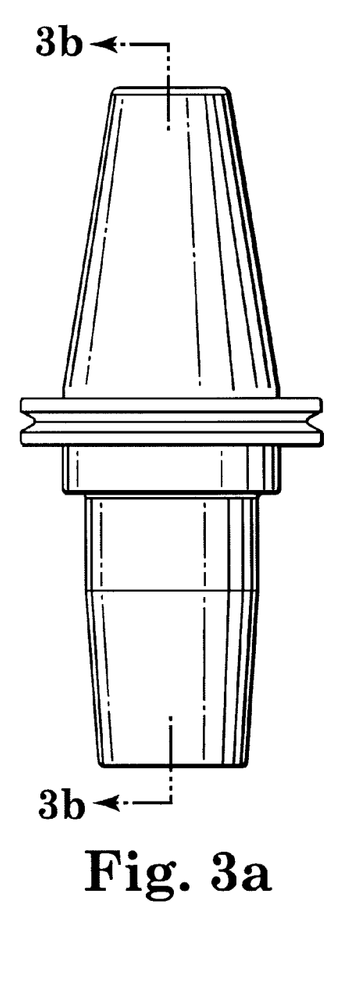
Figure 3B:
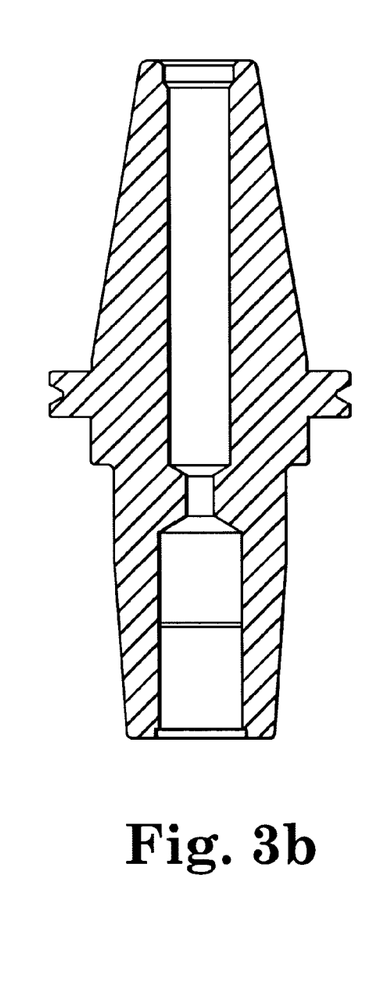

Three prototypes of a tool holder suitable for CNC applications were constructed as shown in FIGS. 2 and 3. FIG. 2 shows a hollow cylindrical sleeve of SMA material designed to fit within the prototype tool holder of FIG. 3. The SMA piece was designed to hold a conventional cutting or forming tool (not shown) having a conventionally sized cylindrical shaft. FIG. 3 shows a modified version of a generic tool holder similar to collet chucks and the like available from Command Tooling Systems of Ramsey, Minn. USA. Thus, together, the prototype pieces form a binary tool holder for CNC applications.

A nickel-titanium SMA commonly designated as NiTiNOL was employed. The SMA pieces were formed from one inch hot rolled bar stock, having a composition of 56% nickel and 44% titanium, and an austenitic finish temperature of 0 Celsius. The stock was water jet cut to a rough length and then machined to final dimensions by using a lathe to face off the ends and to drill out the inside. This process included adding minor bevels and rounds to improve ease of mounting the piece into the tool holder, and inserting the tool itself, all in accordance with known principles. The machining used TiN coated carbide inserts as well as TiN coated carbide drill bits with coolant holes.

After machining, the SMA pieces were heat treated to set their shape. Heat treatment was done through the use of a tube furnace. A thermocouple was mounted to the inside wall of one of the SMA pieces by sticking the thermocouple wire along the wall of the inside diameter of the SMA and then inserting a high temperature insulation to hold the wire against the inner wall. Baseline SMA pieces without thermocouples were similarly fitted with the high temperature insulation so that all three pieces would be heated consistently. The pieces were heated at a setting of 550 Celsius for twenty-five minutes until the thermocouple indicated 500 Celsius, then the pieces were held at 500 Celsius for an additional ten minutes to set their shape. They were then removed from the furnace and immediately quenched them in a water bath at an initial temperature of seven Celsius. After cooling to room temperature, the insulation was removed and the pieces were dried.

The next process was to train the SMA pieces. There are two basic training processes. In a temperature cycling process, the SMA is expanded (e.g., with tapered mandrels) to a desired strain, and the temperature of the piece is repeatedly cycled so that the piece goes from completely martensitic to completely austenitic and back again. In the strain cycling process, the piece is first expanded in the martensitic phase to a desired strain, and the temperature is cycled a single time, from completely martensitic to completely austenitic and back again. Then the piece is cooled and the entire procedure is repeated a given number of times.

The preferred training process was determined to be a strain cycling process comprising 7 steps. First, the entire SMA piece was cooled (e.g., in liquid nitrogen) to a temperature below the martensitic finish temperature. Second, the inside diameter of the SMA piece was expanded to 6% strain while keeping the pieces below the martensitic finish temperature. This was done through the use of multiple differently sized mandrels (corresponding to 2%, 4%, and 6% strain), anti-seize compound, and a hydraulic press, all in accordance with known principles. The SMA material was cooled well below the martensitic finish temperature, removed from the liquid nitrogen, put on the hydraulic press, expanded, then inserted into the liquid nitrogen to ensure that the temperature remained well below the martensitic finish temperature before the process was repeated with the next mandrel. Third, the final mandrel was left in the SMA piece to keep the inside diameter expanded while the temperature of the entire combination (and thus the entire SMA piece) was raised above the austenitic finish temperature. This was done with a hot water bath (approximately 40–45 Celsius) to increase the consistency of the cycling and also reduce the heating time. Fourth, with the mandrel in place, the entire combination (and thus the entire SMA piece) was cooled below the martensitic finish temperature. Fifth, the strain on the SMA piece was released by removing the mandrel. Sixth, the entire SMA piece was heated to a temperature above the austenitic finish temperature using a similar hot water bath. Seventh, the entire procedure was repeated for twenty cycles to achieve a two-way memory effect. The number of repetitions directly affects the amount of strain that can be accomplished through the use of the two-way memory effect.

The SMA pieces were then mounted onto the upper part of the tool holder. A one-inch shrink-fit tool holder was used but this is not a limitation on the scope of the invention. Because the SMA pieces were slightly out of round, their outside diameters were machined to exactly one inch so that they would then fit into the shrink-fit tool holder. The shrink-fit tool holder was heated to approximately 260 Celsius by standard techniques to expand the inner diameter of its bore. Then the SMA piece was inserted. Once the shrink-fit holder began to grip the SMA piece, the entire assembly was quenched in water to prevent heat transfer to the SMA pieces. Once cooled to room temperature, the assembly formed a binary tool holder.

For maximum performance, the inside diameter of the SMA piece was ground to provide concentricity with the tool holder itself. The final grinding also ensures that the final inside diameter is known to one-ten thousandth inch, which optimizes the interference fit between the SMA layer and the tool. Finally, the tool holder was balanced according to conventional techniques.

An alternative temperature cycling training process would expand the SMA piece to a certain strain level, then cycle the temperature so that the piece would fully transform from a completely martensitic phase to the completely austenitic phase for a certain number of cycles. Specific steps are: first, cool the entire SMA piece (e.g., in liquid nitrogen) to a temperature below the martensitic finish temperature. Second, expand the inside diameter of the SMA piece to a desired strain level (e.g., 6% strain) while keeping the pieces below the martensitic finish temperature. This may be done through the use of multiple differently sized mandrels (e.g., corresponding to 2%, 4%, and 6% strain), anti-seize compound, and a hydraulic press, all in accordance with known principles. By cooling the SMA material well below the martensitic finish temperature, the piece may be removed from the liquid nitrogen, put on the hydraulic press, expanded, then inserted into the liquid nitrogen to ensure that the temperature remains well below the martensitic finish temperature before repeating the process with the next mandrel. Third, the final mandrel is left in the SMA piece to keep the inside diameter expanded while the temperature of the entire combination (and thus the entire SMA piece) is raised above the austenitic finish temperature. This may be done with a hot water bath (e.g., approximately 40–45 Celsius) to increase the consistency of the cycling and also reduce the heating time. Fourth, with the mandrel in place, the entire combination (and thus the entire SMA piece) is cooled below the martensitic finish temperature. Steps 3 and 4 are repeated as necessary. Fifth, the strain on the SMA piece is released by removing the mandrel. Sixth, the entire SMA piece is heated to a temperature above the austenitic finish temperature (using, for example, a similar hot water bath).

Figure 4:
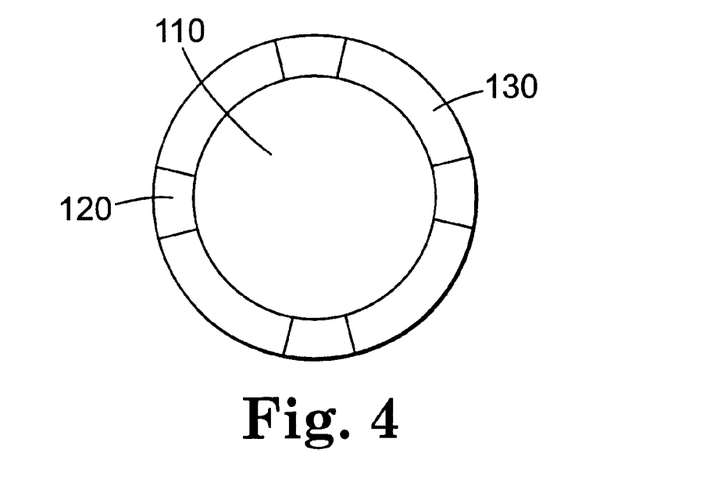
FIGS. 4 and 5 are schematic diagrams illustrating alternative embodiments of the invention.
Figure 5:
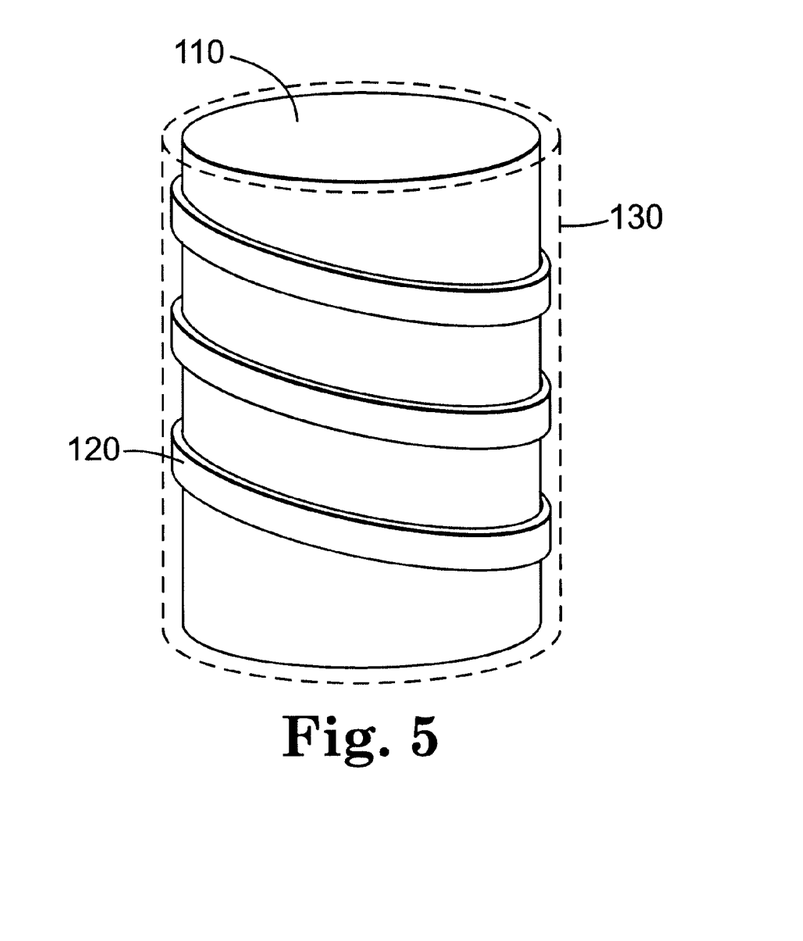

FIGS. 4 and 5 each illustrate that embodiments in which the entire extent of tool 110 is not in intimate contact with SMA layer 120.

FIG. 4 is a schematic cross-sectional view of tool 110 held in place within tool holder 130 by four equally spaced SMA elements 120 that form the layer described above. This cross-sectional view is applicable to a set of four individual plugs of SMA material 120 within tool holder 130; it is also applicable to four strips of SMA material running the length of tool holder 130.

FIG. 5 schematically illustrates an embodiment in which SMA layer 120 is in the form of a spiral spring, coil or twisted wire within tool holder 130. SMA layer 120 could also be in the form of a mesh. The number, size, and locations of the plugs, strips, springs, coils, wires, or mesh forming SMA layer 120 are not limitations on the scope of the invention.

In all embodiments of the invention, it will be understood that a suitable actuation system for placing the SMA layer in either the first or second phases is necessary. This system may be incorporated directly into the tool holder by conventional means (e.g., heating or cooling apparatus such as induction heaters, coolant circulation systems, and so on), or it may be a separate system. Any such actuation system may be automated or manual as circumstances dictate.

In all embodiments of the invention, it will be understood that the discussion of shape memory alloys, and their austenitic/martensitic phase transition at a certain temperature, is simply an example of a broader collection of materials. Such materials are characterized by a change in strain upon application of an external agent to change the material from a first, relatively lower strain phase, to a second, relatively higher strain phase or vice versa. The phase transition may occur above or below the level of an ambient condition at which the intended use of the tool occurs. Such materials could be shape memory alloys (for which the agent is applied thermal energy, i.e., heating/cooling); magnetic shape memory alloys, magnetostrictive materials, and magneto-rheological fluids (for which the agent is an applied magnetic field); or electrostrictive materials, piezoelectric ceramics, piezoelectric polymers, and electro-rheological fluids (for which the agent is an applied electric field).

We claim:

1. A combination for holding a tool, comprising:
   (a) a tool for cutting or forming, comprising a shank having a length and a cross-sectional shape, and
   (b) a tool holder, consisting essentially of at least a layer of shape memory alloy, but not including any conventional material between the shape memory alloy and the cutting or forming tool;
   in which the tool holder is configured to hold the tool along at least a portion of the length of the shank when the shape memory alloy is in the austenitic phase, with sufficient mechanical interaction for the tool to perform its cutting or forming, and
   in which the shape memory alloy has a martensitic/austenitic transition temperature below a temperature at which the tool performs its cutting or forming.

2. A combination for holding a tool, comprising:
   (a) a tool for cutting or forming, comprising a shank having a length and a cross-sectional shape, and
   (b) a tool holder, consisting essentially of at least a layer of shape memory alloy, but not including any conventional material between the shape memory alloy and the cutting or forming tool;
   in which the tool holder is configured to hold the tool along at least a portion of the length of the shank when the shape memory alloy is in the martensitic phase, with sufficient mechanical interaction for the tool to perform its cutting or forming, and
   in which the shape memory alloy has a martensitic/austenitic transition temperature above a temperature at which the tool performs its cutting or forming.

3. The combination of claim 1 or 2, further comprising:
(c) an actuation system for placing the shape memory alloy in an austenitic or a martensitic phase.

4. The combination of claim 3, in which the actuation system is incorporated directly into the tool holder.

5. The combination of claim 3, in which the actuation system heats the shape memory alloy.

6. The combination of claim 3, in which the actuation system employs induction heating to heat the shape memory alloy.

7. The combination of claim 3, in which the actuation system cools the shape memory alloy.

8. The combination of claim 3, in which the actuation system employs circulating coolant to cool the shape memory alloy.

9. The combination of claims 1 or 2, in which the diameter of the tool is less than approximately 0.25 inch.

10. The combination of claims 1 or 2, in which the tool holder consists essentially entirely of shape memory alloy.

11. The combination of claims 1 or 2, in which the shape memory alloy comprises at least one region smaller than an entire extent of a region in which the tool contacts the holder.

12. The combination of claim 11, in which the shape memory alloy comprises between two and five regions arranged annularly around the shank of the tool.

13. The combination of claims 1 or 2, in which the holder comprises two layers of shape memory alloy, a first layer closest to the tool that is martensitic at a temperature at which cutting or forming occurs, and a second layer at least partially surrounding the first layer, the second layer being austenitic at the temperature at which cutting or forming occurs.

14. The combination of claims 1 or 2, in which the cross section of the shank is one of rectangular, round, hexagonal, semicircular, and square.

15. The combination of claims 1 or 2, in which the cross section of the shank is uniformly sized throughout its length.

16. The combination of claims 1 or 2, in which the cross section of the shank is wedge shaped throughout its length.

17. The combination of claims 1 or 2, in which there are forces acting on the tool, the forces having longitudinal and radial components.

18. The combination of claims 1 or 2, in which the tool holder has an outer cross section and an inner cross section that are congruent with each other.

19. The combination of claims 1 or 2, in which the layer of shape memory alloy is a hollow cylindrical sleeve configured to hold a shaft having a circular cross-section.

20. The combination of claims 1 or 2, in which the layer of shape memory alloy is one of a set of plugs, a set of strips, a spiral spring, a coil, a twisted wire, and a mesh.

21. A combination for holding a tool, comprising, in combination,
(a) a tool for cutting or forming, comprising a shank having a length and a cross-sectional shape, and
(b) a tool holder, consisting essentially of at least a layer of a material characterized by a change in strain upon application of an external agent to the material, but not including any conventional material between the material and the cutting or forming tool;
in which the holder is configured to hold the tool along at least a portion of the length of the shank with sufficient mechanical interaction for the tool to perform its cutting or forming when the material is in a first phase, and to release the tool when the material is in a second phase; and
in which the material has a phase transition point outside ambient conditions of the tool during use.

22. The holder of claim 21, in which the material is a shape memory alloy.

23. The holder of claim 21, in which the material is magnetostrictive.

24. The holder of claim 21, in which the material is piezoelectric.

25. The invention of any of claims 1, 2, or 21, in which contact between the tool holder and the shank is contiguous.

26. A method of holding a cutting or forming tool comprising a shank having a length and a cross-sectional shape, with a tool holder consisting essentially of at least a layer of shape memory alloy but not including any conventional material between the shape memory alloy and the cutting or forming tool; the method comprising holding the tool along at least a portion of the length of the shank when the shape memory alloy is in the austenitic phase, with sufficient mechanical interaction for the tool to perform its cutting or forming; and in which the shape memory alloy has a martensitic/austenitic transition temperature below a temperature at which the tool performs its cutting or forming.

27. A method of holding a cutting or forming tool comprising a shank having a length and a cross-sectional shape, with a tool holder consisting essentially of at least a layer of shape memory alloy but not including any conventional material between the shape memory alloy and the cutting or forming tool; the method comprising holding the tool along at least a portion of the length of the shank when the shape memory alloy is in the martensitic phase, with sufficient mechanical interaction for the tool to perform its cutting or forming; and in which the shape memory alloy has a martensitic/austenitic transition temperature above a temperature at which the tool performs its cutting or forming.

28. The method of claims 26 or 27, further comprising placing the shape memory alloy in an austenitic or a martensitic phase.

29. The method of claim 28, further comprising heating the shape memory alloy.

30. The method of claim 28, comprising inductively heating the shape memory alloy.

31. The method of claim 28, further comprising cooling the shape memory alloy.

32. The method of claim 28, further comprising circulating coolant to cool the shape memory alloy.

33. The method of claims 26 or 27, further comprising placing the shape memory alloy in an austenitic or a martensitic phase with an actuation system.

34. The method of claim 33, further comprising directly incorporating the actuation system into the tool holder.

35. The method of claims 26 or 27, in which the diameter of the tool is less than approximately 0.25 inch.

36. The method of claims 26 or 27, in which the tool holder consists essentially entirely of shape memory alloy.

37. The method of claims 26 or 27, in which the shape memory alloy comprises at least one region smaller than an entire extent of a region in which the tool contacts the holder.

38. The method of claim 37, in which the shape memory alloy comprises between two and five regions arranged annularly around the shank of the tool.

39. The method of claims 26 or 27, in which the holder comprises two layers of shape memory alloy, a first layer closest to the tool that is martensitic at a temperature at which cutting or forming occurs, and a second layer at least partially surrounding the first layer, the second layer being austenitic at the temperature at which cutting or forming occurs.

40. The method of claims 26 or 27, in which the cross section of the shank is one of rectangular, round, hexagonal, semicircular, and square.

41. The method of claims 26 or 27, in which the cross section of the shank is uniformly sized throughout its length.

42. The method of claims 26 or 27, which the cross section of the shank is wedge shaped throughout its length.

43. The method of claims 26 or 27, in which there are forces acting on the tool, the forces having longitudinal and radial components.

44. The method of claims 26 or 27, in which the tool holder has an outer cross section and an inner cross section that are congruent with each other.

45. The method of claims 26 or 27, in which the layer of shape memory alloy is a hollow cylindrical sleeve configured to hold a shaft having a circular cross section.

46. The method of claims 26 or 27, in which the layer of shape memory alloy is one of a set of plugs, a set of strips, a spiral spring, a coil, a twisted wire, and a mesh.

47. A method of holding a tool for cutting or forming and comprising a shank having a length and a cross-sectional shape, with a tool holder, consisting essentially of at least a layer of a material characterized by a change in strain upon application of an external agent to the material, but not including any conventional material between the material and the cutting or forming tool, the method comprising holding the tool with the tool holder along at least a portion of the length of the shank with sufficient mechanical interaction for the tool to perform its cutting or forming when the material is in a first phase, and to release the tool when the material is in a second phase; and in which the material has a phase transition point outside ambient conditions of the tool during use.

48. The holder of claim 47, in which the material is a shape memory alloy.

49. The holder of claim 47, in which the material is magnetostrictive.

50. The holder of claim 47, in which the material is piezoelectric.

51. The invention of any of claims 26, 27, and 47, in which contact between the tool holder and the shank is contiguous.

* * * * *